United States Patent [19]
Godlewski

[11] Patent Number: 4,542,174
[45] Date of Patent: Sep. 17, 1985

[54] ORGANOSILICON/OXIRANE ADDITIVES FOR FILLED CONDENSATION POLYMER COMPOSITES

[75] Inventor: Robert E. Godlewski, Mahopac, N.Y.

[73] Assignee: Union Carbide Corporation, Danbury, Conn.

[21] Appl. No.: 589,470

[22] Filed: Mar. 14, 1984

[51] Int. Cl.[4] .......................... C08K 5/16; C08K 5/54
[52] U.S. Cl. .................................... 523/508; 524/262
[58] Field of Search ......................... 524/262; 523/508

[56] References Cited

U.S. PATENT DOCUMENTS

| | | | |
|---|---|---|---|
| 3,833,534 | 9/1974 | Tiervey et al. | 524/262 |
| 3,855,175 | 12/1974 | Kakizaki | 524/262 |
| 4,203,887 | 5/1980 | Goedde et al. | 524/262 |
| 4,305,863 | 12/1981 | Adachi et al. | 524/262 |
| 4,359,545 | 11/1982 | Ona et al. | 524/262 |

FOREIGN PATENT DOCUMENTS

| | | | |
|---|---|---|---|
| 50-95359 | 7/1975 | Japan | 524/262 |
| 1237844 | 6/1971 | United Kingdom | 524/262 |

Primary Examiner—Joseph L. Schofer
Assistant Examiner—N. Sarofim
Attorney, Agent, or Firm—Paul W. Leuzzi, II

[57] ABSTRACT

Combinations of oxirane compounds and acylamino or cyano silanes which are stable at room temperature when incorporated, either by integrally blending or pre-treatment onto fillers, into filled condensation polymer systems produce superior composites exhibiting hydrolytic stability. These combinations make excellent one-component additives for inorganic fillers employed in filled condensation polymer systems.

32 Claims, No Drawings

ORGANOSILICON/OXIRANE ADDITIVES FOR FILLED CONDENSATION POLYMER COMPOSITES

BACKGROUND

1. Field of the Invention

This invention relates to filled condensation polymer composites and to additives added to the filler for maintaining or enhancing the mechanical properties of the filled condensation polymer composite, including improved hydrolytic stability. More particularly, the invention relates to organosilicon/oxirane additives for maintaining or enhancing these mechanical properties. These organosilicon/oxirane additives being stable at room temperature.

2. Description of the Prior Art

The incorporation of epoxy resins into mineral filled thermoplastic polyester composites has been reported to result in improvements in the as molded mechanical properties. See U.S. Pat. Nos. 3,547,872; 3,547,873; 3,886,104 and 4,034,013. The specific use of epoxy resins in polycarbonates and polyestercarbonates are reported in Netherland patents Nos. 82028930-K-10 and 8202931-K-10. However, the hydrolytic stability of these epoxy resin containing composites is commercially unacceptable.

Japanese Kokai No. 76-30254 (Mar. 15, 1976) teaches the use of an epoxy resin in combination with an aminosilane, such as gamma-aminopropyltriethoxysilane, as a pretreatment for inorganic fillers. This Japanese reference is specific in that 0.02 to 5 weight percent of the aminosilane and 0.1 to 10 weight percent of the epoxy resin, relative to the inorganic filler, must be employed. It is taught in the Japanese reference that to employ more or less than these amounts would adversely affect the thermoplastic polyester composition. Although this approach can overcome the problems associated with hydrolytic stability, the commercial practicality of such a treatment is severely limited by the poor stability of a one-component epoxy resin/aminosilane combination. Indeed, the Japanese reference fails to identify its use as a one-component system even though such systems are preferred commercially.

Thus, there exists the need for an additive which is stable at room temperature and which in filled condensation polymer composites will improve and maintain the mechanical properties of the filled condensation polymer composite. In particular, the composite should exhibit hydrolytic stability.

OBJECTIVES OF THE INVENTION

It is an objective of the present invention to provide a novel organosilicon/oxirane additive for filled condensation polymer composites which will maintain or enhance the mechanical properties of the composite.

It is a further object of this invention to provide a filled condensation polymer composite which has increased hydrolytic stability.

It is another object of this invention that the organosilicon/oxirane additive not present any processing problems in its use in filled condensation polymer composites.

Finally, it is an object of the present invention that the organosilicon/oxirane additive be capable of use as a one-component system and as such not be susceptable to phase separation or curing into a hard resinous mass (shelf-life stability) at room temperature.

SUMMARY OF THE INVENTION

The present invention provides a novel organosilicon/oxirane additive useful with fillers in filled condensation polymer composites. The novel additive is a combination of oxirane resin compounds and acylamino or cyano silanes. The novel additive is stable at room temperature, can be integrally blended with the filler, condensation polymer, or a blend of the filler and condensation polymer or pre-treated onto the filler to produce a filled condensation polymer composite which exhibits improvements in as-molded mechanical properties and excellent hydrolytic stability.

DETAILED DESCRIPTION OF THE INVENTION

In accordance with the present invention there is provided a novel organosilicon/oxirane additive for fillers. The additive comprises (1) an oxirane resin component and (2) an acylamino or cyano silane.

The oxirane resin component contains at least one oxirane ring

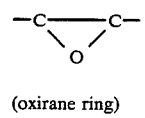

(oxirane ring)

and is generally represent by the formula:

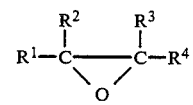

wherein $R^1$, $R^2$, $R^3$ and $R^4$ are individually a radical selected from the group of radicals consisting of alkyl, aryl, alkenyl, epoxy, organosilyl and hydrogen. Such materials include epoxy resins, monoepoxy copolymers, epoxidized natural oils, and the like.

Preferably epoxy resins are employed. Generally, epoxy resins are those resins prepared from compounds containing an average of more than one oxirane ring per molecule. Epoxy resins are known in Europe as epoxide resins. Depending upon their chemical nature, they may also be referred to as epoxidized polyolefins, peracetic acid epoxy resins, epoxy olefin polymers, epichlorohydrin resins, bisphenol A resins, epixhlorohydrinbisphenol A condensates, epi-bis resins and 2,2-bis(para-hydroxyphenyl)propane diglycidyl ether polymers.

Typically, the oxirane resin component is prepared through an epoxidation of an olefin. The epoxy resins are generally prepared by reacting epichlorohydrin with an active-hydrogen-bearing compound. Any oxirane resin component can be employed.

Suitable oxirane compositions include, but are not limited to, beta-(3,4-epoxycylohexyl)-ethyltrimethoxysilane, gamma-glycidoxypropyltrimethoxysilane, epoxidized polybutadiene, vinylcyclohexene dioxide, 3,4-epoxycychohexylmethyl 3-4-epoxy cychohexane carboxylate, bis(2,3-epoxycyclopentyl)ether, 3-(3,4-epoxycyclohexane)-8,9-epoxy-2,4-dioxaspiro[5,5]-undecane; bis(3,4-epoxy-6-methylcyclohexylmethyl)adipate;

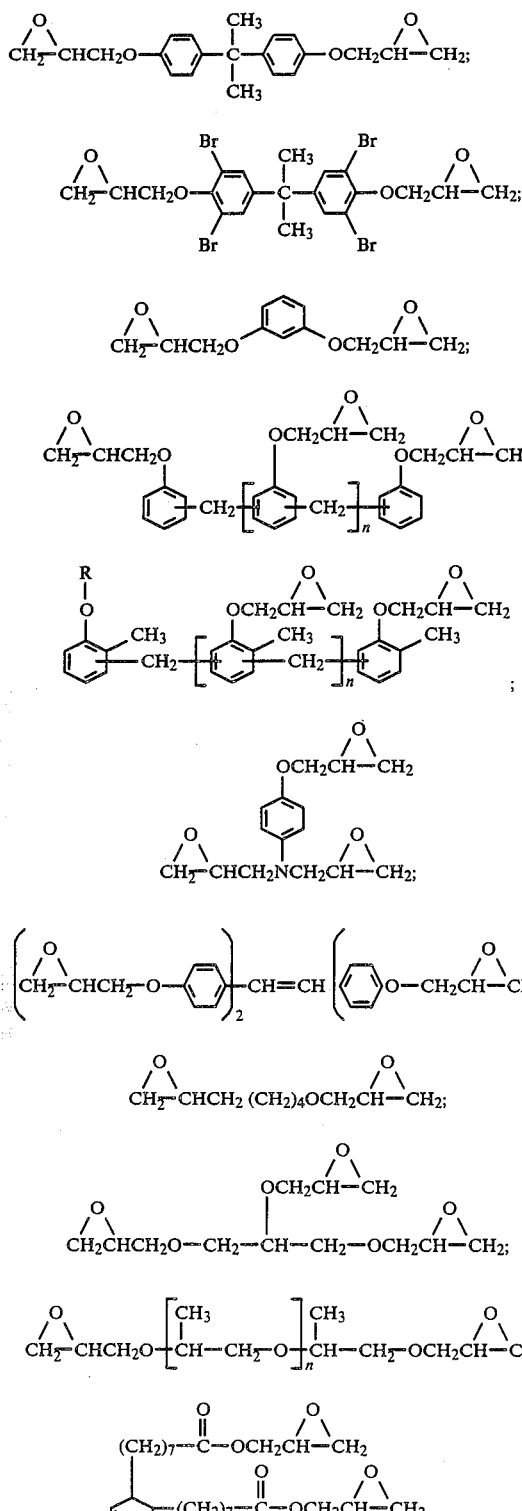

The silane component contains at least one acylamino or cyano silane linkage

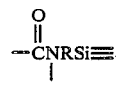

(acylamine silane linkage)

(cyano silane linkage)

wherein R is an alkylene or arylene radical.

Suitable acylamino silanes include, but are not limited to, gamma-ureidopropyltriethoxysilane, gamma-acetylaminopropyltriethoxysilane, delta-benzoylaminobutylmethyldiethoxysilane, and the like. Reference is made to U.S. Pat. Nos. 2,928,858; 2,929,829; 3,671,562; 3,754,971; 4,046,794; and 4,209,455 for more details about these silanes and how they are prepared. Preferably, the ureido silanes are preferred and in particular gamma-ureidopropyltriethoxysilane.

Suitable cyanosilanes include, but are not limited to, cyanoeethyltrialkoxysilane, cyanopropytri-alkoxysilane, cyanoisobutyltrialoxysilane, 1-cyanobutyltrialkoxysilane, 1-cyanoisobutyltrialkoxysilane, cyanophenyltrialkoxysilane, and the like. It is also envisioned that partial hydrolysis products of such cyanosilanes and other cyanoalkylene or arylene silanes would be suitable for use in this invention. A more complete description of cyanosilanes can be found in Chemistry and Technology of Silicones by Walter Noll, *Academic Press*, 1968, pp. 180–189.

The novel organosilicon/oxirane composition is generally employed in an amount ranging from 0.02 to 20 weight percent, based on the weight of the filler and preferably from 0.5 to 5 weight percent. These general ranges are dependent on the filler loading, i.e., at very high filler loadings lower additive ranges exhibit the desired results and at very low filler loadings higher additive ranges may be necessary to achieve the intended results. Generally, the oxirane component represents from 5 to 95 weight percent of the additive and preferably from 25–75 weight percent, and the silane component represents from 95 to 5 weight percent of the additive, preferably from 75 to 25 weight percent.

The fillers used in the condensation polymer composite are known to those skilled in the art and include any suitable finely divided or particulate substance. At the time of incorporation into the condensation polymer composite most fillers may be in the form of finely divided particles. They may be of any configuration, such as approximately isotropic, having a maximum diameter, i.e., a maximum linear dimension of ten microns, preferably five microns; or in the form of plates or needles (fibers) having a thickness or diameter of ten microns or less, preferably five microns or less. The minimum size of the filler particles is not critical, any of the conventionally used fillers being suitable in this respect. Among the specific fillers which may be used in the present invention are asbestos, chopped glass, kaolin and other clay minerals, silica, calcium silica, calcium carbonate (whiting), magnesium oxide, barium carbonate, barium sulfate (barytes), metal fibers and powders, glass fibers, refractory fibers, non-reinforcing or reinforcing carbon blacks, antimony oxide, titanium dioxide, mica, talc, chopped glass, alumina, quartz, wollastonite (calcium silicate), and inorganic coloring pigments. Organic fillers may include cotton linters and other celulosic materials, wood flour, synthetic fibers and the like. The preferred fillers are clay, mica, wollastonite, and chopped glass.

Integral blending of the additives has a substantial economic advantage over a pre-treated filler which involves savings in time and energy. and provides convenience and simplicity. Pre-treatment of a filler with an additive is a separate operation requiring a high intensity mixer like Henschel or twin-shell blender equipped with a revolving high RPM intensifier mixing blade to prevent agglomeration. The additives must be added slowly at a steady flow rate to prevent agglomeration. During the pre-treatment step, localized high temperatures are encountered at or near the high speed mixing blades of the equipment employed.

In utilizing the integral blending technique, the additives must be capable of dispersing the filler and the additives must also be capable of being uniformly distributed throughout the filler. This prevents agglomeration. In integral blending according to this invention, the additives can be added rapidly (one-shot) to the filler or filler/resin mixture followed by gentle agitation. Low level usage of the additives, whilestill maintaining benefits of the reinforcing additives, is a substantial and unexpected advantage of this invention. Furthermore, the additives can be integrally blended according to this invention directly into the processing equipment (e.g., Farrel continuous mixers and extruders) containing the filler/resin mixture and prior to the fluxing stage of the melt composite. For these reasons integral blending is a preferred embodiment of the present invention. However, pre-treatment is compatible with the present invention and in some instances may represent a preferred method of addition, depending on the particular circumstances, i.e., condensation polymer used, filler, additive, etc.

The condensation polymer used in the filled condensation polymer composite may be any condensation polymer or polycondensate with which fillers are normally incorporated in. Common types of condensation polymers are polyesters (from esters of dicarboxylic acids or dicarboxylic acids and glycols), and polyamides (from dicarboxylic acids and diamines or from lactomes). Blends of these materials together or with other polymers, i.e., polyvinylacetate or styrene maleic anhydride copolymers, are also envisioned.

Illustrative of some of the more common types of polyamide condensation polymers include, but are not limited to, the following reaction schemes used to produce them.

1. The reaction of diamines with dicarboxylic acids.
2. Self condensation of a ω-amino-acid.
3. Opening of a lactam ring.
4. The reactiopn of diamines with diacid chlorides.

The polyamide polymers are well known in the art and include those semi-crystalline and amorphorus polymers referred to as nylons. A number of polyamides are described in U.S. Pat. Nos. 2,071,250; 2,071,251; 2,130,523; 2,130,948; 2,241,322; 2,312,966; 2,512,606; and 3,393,210.

Examples of polyamides include, but not limited to:
Poly(hexamethylene adipamide) (Nylon 6/6)
Poly(hexamethylene azelaamide) (Nylon 6/9)
Poly(hexamethylene sebacamide) (Nylon 6/10)
Poly(hexamethylene dodecanoamide) (Nylon 6/12)

The polyamides produces by ring opening of lactams, e.g. polycaprolactam (Nylon 6). polyauryllactam (Nylon-12) and poly(11-aminoundecanoic acid) (Nylon-11). Other suitable condensation polymers include poly(oxyalkanoyls), poly(alkylene oxalates), poly(alkylene adipates), poly(alkylene sebacates), poly(trimethylene alkanedicarboxylates), poly(hexamethylene alkanedicarboxylates), poly(decamethylene alkane-dicarboxylates), poly(trans-1,4-cyclohexylene alkanedicarboxylates), poly(1,4-cyclohexanedimethylene alkanedicarboxylates), poly(alkylene terephthalates), poly(alkylene isophthalates), poly(p-phenylene alkane dicarboxylates), poly(alkylene p-phenylenediacetates), poly(p-xylylene alkanedicarboxylates), poly(m-xylylene alkanedicarboxylates), poly(p-phenylenedialkylene terephthalates), poly(alkylene 1,2-ethylenedioxy-4,4'-dibenzoates), poly(alkylene 4,4'-dibenzoates), poly(alkylene 2,6-naphthalene dicarboxylates), and poly(alkylene sulfonyl-4,4'-dibenzoates). In particular the polyesters are preferred, and of those polyethylene terephthalate (PET) and polybutylene terephthalate (PBT) are the preferred polyesters.

The amount of filler treated with the organosilicon-/oxirane additive that is blended with the condensation polymer may vary over a wide range depending upon the particular end-use application. Usually the additive-filler mixture is at least five (5%) percent by weight, of the filled condensation polymer composite to obtain a substantial effect on the mechanical characteristics. It is rarely desirable that the additive-filler mixture exceed eighty-five (85%) percent by weight of the filled condensation polymer composite. Within these limits the preferred amount of each component will depend largely upon the choice of filler in general and the specific end-use application in particular. For these reasons further limitations of the ratio of components to one another cannot be provided without detracting from the spirit of the present invention.

In addition to the components, previously discussed in detail, other ingredients conventionally used in such composites may also be incorporated. These include, where appropriate plasticizers, vulcanizing agents, interfacial agents crosslinking agents, crystallization rate additives (enhancers and retardants), dyes, pigments, and the like.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are be weight unless otherwise specified.

NONEMCLATURE

The following designations used in the Examples and elsewhere herein have the following meanings:

| | |
|---|---|
| PBT (Gafite TM 1400A) — | Purchased from GAF Corp. Reaction product of dimethyl terephthalate and 1,4 butanediol. Nominal 0.8 Intrinsic Viscosity (25° C. in ortho chloro phenol). |
| PET (Cleartuf TM 7207) — | Purchased from Goodyear Corp. Reaction |

-continued

| | |
|---|---|
| | products of terephthalic acid or dimethylterephthalate with ethylene glycol. Nominal 0.72 intrinsic viscosity (30° C. in trifluoro acetic acid). |
| Nylon (Zytel ™ 101) — | Nylon 66 from DuPont. |
| Whitex ™ Clay — | Freeport-Kaolin calcined clay. Nominal average particle size 3μ. |
| Wollastonite (NYAD ™ G) — | Calcium silicate filler (15/1 aspect ratio nominal). Purchased from Nyco Corp. |
| Epon 828 — | Epoxy resin from Shell Chemical Co. Reaction product of Bisphenol A and epichlorohydrin. Nominal equivalent wt. of 190. |
| UPTES — | Gamma-ureidopropyltriethoxysilane as a 50% solution in methanol |
| GAPTES — | gamma-aminopropyltriethoxysilane |
| DCS — | 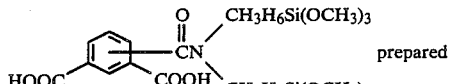 prepared by reaction of trimellitic anhydride and (CH3O)3Si(CH2)3NH(CH2)3Si(OCH3)3 |
| CNM — | cyanoethyltrimethoxysilane |
| CNE — | cyanoethyltriethoxysilane |
| Extruder Melt Processing — | The employment of extruders which are heated to facilitate the melting of thermoplastic condensation polymers into which chopped glass, mineral fillers or combinations of each have been incorporated or mixed during or prior to extrusion. Examples 1–4 composites were processed in a Werner-Pleiderer ZSK-30 twin screw extruder (24/1 L/D ratio). Example 5 composites were melt processed in a Hartig 2 in dia. single screw extruder (24/1 L/D ratio). |
| Injection Molding — | ASTM test specimens were molded in an Arburg 2 oz., 22 ton unit. |
| As Molded — | ASTM test specimens molded in the Arburg equipment were allowed to come to equilibrium for at least 48 hours at room temperature before testing. |
| 72 Hr. Water Boil Test — | ASTM test specimens submerged in boiling water for 72 hrs., dried 2 hrs. at 220° F., allowed to come to equilibrium at room temperature for at least 24 hrs. prior to testing. |
| Tensile Strength — | Per ASTM D-638 (0.2 in/min. test rate). |
| Modified Unnotched Izod Impact Strength — | Specimen, unnotched, measuring 2.5 × 0.5 × 0.125 in. is placed in Izod impact tester so that ½ of the length of specimen is exposed for impact. Impact calculated in foot-lbs./in. This is a modified ASTM D-256 test. |
| Notched Izod Impact Strength — | Per ASTM D-256. |
| psi — | pounds per square inch |
| % — | percent by weight unless otherwise specified |
| g — | grams |
| wt — | weight |
| parts — | parts by weight unless otherwise indicated |
| pts — | parts by weight unless otherwise indicated |
| pbw — | parts by weight |
| ppm — | parts by wt. per million parts by wt. |
| Ft-lbs/in — | ft. pounds per inch |
| In-lbs/in — | inch pounds per inch |
| phr — | parts per hundred resin (polymer), by weight |
| HDT @ 264 psi ASTM D648 | |
| Pre-Treated — | Method of applying additive to treat or coat finely divided filler prior to adding to thermoplastic by diluting additive with 4 parts methanol/water (9:1 volume ratio) and applying to filler employing a Patterson-Kelly twin shell blender. Drying cycle of 2 hours at 105° C. |
| Integral Addition — | the simple incorporated of liquid or solid additives to a mixture of filler/resin while agitating the mixture prior to melt processing. Hobart mixer, Henschel mixer, ribbon blender or drum tumbler are typically employed. |

EXAMPLES

1. A series of experiments were initiated to determine whether a room temperature stable and effective one-component additive for filled condensation polymer composites could be produced. It was revealed that an epoxy resin (Epon 828) combined with gamma aminoprophyltriethoxysilane is relatively unstable at room temperature when compared to separate mixtures of Epon 828 with either UPTES, CNM and DCS, respectively. The experiment consisted of mixing an oxirane with a silane in a petridish which was then covered. Visual observations over a period of time were recorded. Evidence of a hard resinous mass was the end point. For example, when Epon 828 and gamma aminopropyltriethoxysilane were combined at 2/1 by weight ratio a semi-gelatinous product was evident in 6 hours at room temperature, a soft solid mass in 24 hours and a solid resinous product in 48 hours. Table 1 describes the results employing the visual observation of a solid resinous product as an end point. It can be seen that UPTES, CNM and the lowest loading of DCS each, when combined with Epon 828, did not produce a solid resinous product in 192 hours. These systems were concluded to be more stable than Epon 828/gamma aminopropyltriethoxysilane.

2. Table 2 describes the mechanical properties of 40% Whitex ™ clay filled PBT/PET (3/1 ratio) composites. It can be seen that the combination of Epon 828/UPTES, especially the lower level of UPTES at constant Epon 828 loading, is comparable in performance to Epon 828/gamma aminopropyltriethoxysilane. Both composites are superior to the control composite before and after the water boil test.

3. Table 3 describes the performance of Epon 828/CNM at two levels, in 40% clay filled PBT/PET (3/1 ratio). The mechanical properties of these composites are superior to a control composite before and after the 72 hour water boil test.

4. Table 4 describes the performance of Epon 828/DCS, at two separate levels, in 40% clay filled PBT/PET (3/1 ratio). The lower level of DCS in combination with a constant level of Epon 828 is favorable in light of the room temperature stability of Epon 828/DCS ratios described in Table 1. The composites containing DCS approach the performance of composites containing gamma aminopropyltriethoxysilane; they are superior to control composites.

5. Chopped glass/clay filled PET composites are described in Table 5. Epon 828 combined separately with UPTES and CNE in 15% chopped glass/15% clay filled PET composites perform significantly better than the control composite on the basis of as molded properties.

6. A 1/1 ratio by weight of EPON-828/UPTES was mixed and heated to 75° C., whereupon a vacuum was employed to remove the methanol. A clear, amber colored, homogeneous product, stable at room temperature, resulted. The methanol stripped EPON-828/UPTES was integrally blended into a mixture of 1/8 in. chopped glass and PBT/PET (4/1 ratio). A control composite consisted of 1/8 in. chopped glass mixed with PBT/PET (4/1 ratio) in the absence of EPON-828/UPTES. A constant 30% chopped glass level was employed in each composite; stripped EPON-828/UPTES levels of 1.5% and 3.0% (based on glass) were examined.

Table 6 lists composite properties after melt extrusion and injection molding of test specimens. The composites containing EPON-828/UPTES were superior to the control composite after a 24 hour water boil test. And, were superior in retention of impact strengths after a long term heat aging (300 hrs. at 180° C.) when compared to the control composite.

7. Employing a Hobart stainless steel mixer equipped with a standard mixing blade. 500 g of Epon 828 and 500 g of UPTES (50% solids in methanol) were charged to the mixing bowl followed by stirring at slow speed. Based on a side experiment this mixture is non-homogeneous; UPTES solids settles out with time. However, before settling occurred the mixture was transferred to a quart glass bottle. The bottle contents, with a loosely installed cork stopper, was placed in a water bath set at 50° C. The mixture was exposed to 50° C. for 5 hours. Subsequent cooling of the bottle and contents followed. One month after preparation there is no evidence of settling. The mixture is clear and homogeneous (referred to as Product 7).

8. The experiment described in Example 7 produced a clear ad homogeneous mixture which contains approximately 25% methanol from UPTES. The removal of methanol immediately following the 5 hr. at 50° C. heating cycle, as described in Example 7, was accomplished by employing a vacuum. A clear, homogeneous, slightly viscous product resulted.

9. Table 8 describes the properties of 40% Whitex clay filled nylon composites containing the clear and homogeneous mixture of Example 6 and an Epon 828/DCS combination. These composites are, overall, superior to the control composite especially after exposure to boiling water for 72 hours. This experiment also points out the versatility of the additives.

It has been confirmed that an epoxy resin (Epon 828) does indeed improve the molded properties of a 40% Wollastonite (grade NYADG from Nyco Corp.) filled PBT/PET composite when compared to a control composite. This is in contrast to the epoxy resins performance in a 40% calcined clay (Whitex clay from Freeport-Kaolin) filled PBT/PET. In this case only the as molded composite impact strength was improved and with a severe dark color change of the composite which is unacceptable commercially.

TABLE 1

ROOM TEMPERATURE REACTIVITY OF OFS MIXED WITH EPON 828 (COVERED PETRI DISH EXPERIMENT)

|  | 1 | 2 | 3 | 4 | 5 | 6 | 7 | 8 | 9 | 10 |
|---|---|---|---|---|---|---|---|---|---|---|
| Epon 828 | 10 | — | — | 10 | 10 | — | — | 5 | 5 | 5 |
| beta(3,4-epoxycyclohexyl)ethyltrimethoxysilane | — | 13 | — | — | — | — | — | — | — | — |
| gamma-glycidoxypropyltrimethoxysilane | — | — | 12.5 | — | — | 12.5 | 12.5 | — | — | — |
| GAPTES | 5 | 5 | 5 | — | — | — | — | — | — | — |
| UPTES (50% solids in CH$_3$OH) | — | — | — | 12 | — | 12 | — | — | — | — |
| CNM | — | — | — | — | 4.6 | — | 4.6 | — | — | — |
| DCS* | — | — | — | — | — | — | — | 1.5 | 3.0 | 6.0 |
| HOURS TO HARD RESINOUS MASS (VISUAL OBSERVATION) | 48 | 120 | 120 | >192 | >192 | >192 | >192 | >192 | 168 | 72 |

Note:
Ingredients mixed in petri dish, covered, and observed for evidence of formation of hard resinous mass.
*64% silane in CH$_2$Cl$_2$ solvent

TABLE 2

40% WHITEX CLAY FILLED PBT/PET (3/1 RATIO) COMPOSITES

|  | Control Range of Properties | 2% Epon 828 (IB) 1% GAPTES (PT) Range of Properties | 2% Epon 828 (IB) 1.2% UPTES (PT) Neat | 2% Epon 828 (IB) 2.4% UPTES (PT) Neat |
|---|---|---|---|---|
| As Molded |  |  |  |  |
| Tensile Strength, psi | 5110–5400 | 9170–9490 | 8720 | 9500 |
| Unnotched Izod Impact Strength, Ft-Lbs/In | 1.9–2.8 | 9.4–13 | 9.6 | 6.7 |

TABLE 2-continued

| | 40% WHITEX CLAY FILLED PBT/PET (3/1 RATIO) COMPOSITES | | | |
|---|---|---|---|---|
| | Control<br>Range of Properties | 2% Epon 828 (IB)<br>1% GAPTES (PT)<br>Range of Properties | 2% Epon 828 (IB)<br>1.2% UPTES (PT)<br>Neat | 2% Epon 828 (IB)<br>2.4% UPTES (PT)<br>Neat |
| After 72 Hr.<br>Water Boil | | | | |
| Tensile<br>Strength, psi | 2690–3450 | 6550–7440 | 6930 | 8000 |
| Unnotched Izod<br>Impact Strength,<br>Ft-Lbs/In | 0.9–0.9 | 3.4–6.3 | 4.5 | 4.5 |

Note:
(IB) = Integrally blended
(PT) = Pretreated on filler
Note:
Levels of Epon 828 and GAPTES based on Whitex clay concentration in composite.

TABLE 3

| | 40% WHITEX CLAY FILLED PBT/PET (3/1 RATIO) COMPOSITES | | | | |
|---|---|---|---|---|---|
| | Control<br>Range of Properties<br>(From Tables 1 and 2)<br>(Dried[1]) | 2% Epon 828 (IB)<br>0.8% Distilled<br>CNM (PT) | | 2% Epon 828 (IB)<br>1.5% Distilled<br>CNM (PT) | |
| | | Dried[1] | Undried | Dried[1] | Undried |
| As Molded | | | | | |
| Tensile<br>Strength, psi | 5110–5400 | 9020 | 9340 | 9240 | 9450 |
| Unnotched Izod<br>Impact Strength,<br>Ft-Lbs/In | 1.9–2.8 | 8.8 | 7.2 | 9.1 | 9.7 |
| After 72 Hr.<br>Water Boil | | | | | |
| Tensile<br>Strength, psi | 2690–3450 | 6830 | 6940 | 8110 | 7680 |
| Unnotched Izod<br>Impact Strength,<br>Ft-Lbs/In | 0.9–0.9 | 4.0 | 3.5 | 3.1 | 3.9 |

Note:
(IB) = Integrally blended
(PT) = Pretreated on filler
[1]Resins dried 4 hours at 300° F.

TABLE 4

| | 40% WHITEX CLAY FILLED PBT/PET (3/1 RATIO) COMPOSITES | | | |
|---|---|---|---|---|
| | Control<br>2% Epon 828 (IB)<br>1% GAPTES (PT) | Control<br>2% Epon 828 (IB)<br>1% GAPTES (PT) | Example<br>2% Epon 828 (IB)<br>1% DCS (PT)* | Example<br>2% Epon 838 (IB)<br>2.4% DCS* (PT) |
| As Molded | | | | |
| Tensile<br>Strength, psi | 9490 | 9170 | 9270 | 8950 |
| Unnotched Izod<br>Impact Strength,<br>Ft-Lbs/In | 9.4 | 13 | 7.0 | 5.5 |
| After 72 Hr.<br>Water Boil | | | | |
| Tensile<br>Strength, psi | 6550 | 7440 | 7640 | 6860 |
| Unnotched Izod<br>Impact Strength,<br>Ft-Lbs/In | 3.4 | 6.3 | 2.7 | 2.9 |

Note:
(IB) = Integrally blended
(PT) = Pretreated on filler
Note:
Levels of Epon 828 and GAPTES and DCS based on Whitex clay concentration in composite.

TABLE 5

| | 15% CHOPPED GLASS*/15% WHITEX CLAY FILLED PET** COMPOSITES | | | |
|---|---|---|---|---|
| As Molded | Control | 2% Epon 828 (IB)<br>1% Neat UPTES (PT) | 2% Epon 828 (IB)<br>1% CNE (PT) | 2% Epon 828 (IB)<br>1% CNE (IB) |
| Tensile<br>Strength, psi | 9550 | 12250 | 11990 | 13500 |
| Unnotched Izod<br>Impact Strength | 2.7 | 5.6 | 5.7 | 5.1 |

TABLE 5-continued

15% CHOPPED GLASS*/15% WHITEX CLAY FILLED PET** COMPOSITES

| As Molded | Control | 2% Epon 828 (IB) 1% Neat UPTES (PT) | 2% Epon 828 (IB) 1% CNE (PT) | 2% Epon 828 (IB) 1% CNE (IB) |
|---|---|---|---|---|
| Ft-Lbs/in | | | | |

*PPG-3540 (⅛")
**Composites contain 1% Surlyn ™ 8660 and 3% Benzoflex ™ S312 based on PET concentration.
Note:
(IB) = Integrally blended
(PT) = Pretreated on filler
Note:
Levels of Epon 828, UPTES and CNE based on Whitex clay concentration in composite.

TABLE 6

30% CHOPPED GLASS (⅛ IN.) FILLED PBT/PET (4/1 RATIO)

| | PPG-3540 | PPG-3540 | PPG-3540 |
|---|---|---|---|
| Chopped Glass (⅛ in.) | | | |
| EPON-828/UPTEX Mixture, % (100% Solids)* | — | 1.5 | 3.0 |
| | AS-MOLDED PROPERTIES | | |
| Tensile Strength, psi | 16,900 | 20,400 | 19,500 |
| Notched Izod Impact Strength, ft-lbs/in. | 1.3 | 1.1 | 1.6 |
| Reverse Notched Izod Strength, ft-lbs/in. | 8.9 | 11 | 9.1 |
| | HEAT AGED[1] 300 HOURS AT 180° C. | | |
| Notched Izon Impact Strength, ft-lbs/in. | 0.6 | 1.3 | 1.4 |
| Reverse Notched Izod Impact Strength, ft-lbs/in. | 3.0 | 6.0 | 4.9 |
| | AFTER 24 HOUR WATER BOIL[2] | | |
| Tensile Strength, psi | 12,800 | 17,500 | 17,100 |
| Notched Izod Impact Strength, ft-lbs/in. | 1.1 | 1.3 | 1.6 |
| Reverse Notched Izod Impact Strength, ft-lbs/in. | 5.0 | 7.6 | 4.9 |

*Loading based on glass level; EPON-828/UPTES (4/1 ratio) stripped of methanol then integrally blended.
[1]Specimens conditioned at room temperature for 48 hours prior to testing.
[2]Specimens dried 2 hours at 220° F. followed by 48 hours at room temperature prior to testing.

TABLE 7

40% WHITEX CLAY FILLED PBT/PET (3/1 RATIO) COMPOSITES

| | Control | Pretreated on Clay Room Temp. Mixture[(1)] 2% Epon 828 2% UPTES | Mixture[(2)] of 2% Epon 828 2% UPTES Heated 5 hrs at 50° C. |
|---|---|---|---|
| As Molded | | | |
| Tensile Strength, psi | 5290 | 9170 | 9260 |
| After 72 Hrs. Water Boil | | | |
| Tensile Strength | 3000 | 6990 | 7040 |

[(1)]Mixture pretreated on clay before settling of ureido silane occurred. Methanol from UPTES (50% solids in methanol) volatilized during drying cycle (2 hrs. at 105° C.) after clay was pretreated.
[(2)]This mixture is stable at room temperature. Methanol from UPTES volatilized during drying cycle (2 hrs. at 105° C.) after clay was pretreated.

TABLE 8

40% WHITEX CLAY FILLED NYLON (ZYTEL 101) Composites

| | Control | 4.0% Product 6 (PT) | 2% Epon 828 (IB) 1% DCS (PT) |
|---|---|---|---|
| As Molded | | | |
| Tensile Strength, psi | 12600 | 12400 | 12900 |
| Unnotched Izod Impact Strength, Ft-Lbs/In | 13 | 14 | 20 |
| Notched Izod Impact Strength, Ft-Lbs/In | 0.8 | 1.2 | 0.6 |
| After 72 Hr. Water Boil | | | |
| Tensile Strength, psi | 5940 | 7140 | 6950 |
| Unnotched Izod Impact Strength, Ft-Lbs/In | 7.0 | 22 | 14 |
| Notched Izod Impact Strength, Ft-Lbs/In | 0.5 | 1.0 | 0.7 |

Note:
(IB) = Integrally blended
(PT) = Pretreated on filler
*Followed by drying for 2 hrs at 220° C. which volatilizes approximately 25% methanol. This reduces level of additive on filler to 3%.

I claim:

1. An organosilicon/oxirane composition comprising from 5 to 95 weight percent of an oxirane compound and from 95 to 5 weight percent of organosilicon selected from the group of an acylamino and cyano silanes and combinations thereof, wherein the oxirane compound is an epoxy resin.

2. The organosilicon/oxirane composition of claim 1 comprising from 25 to 75 weight percent of an oxirane compound and from 75 to 25 weight percent of an acylamino or cyano silane.

3. The organosilicon/oxirane composition of claim 1 wherein the epoxy resin is prepared by reacting epichlorohydrin with an active hydrogen hearing compound.

4. The organosilicon/oxirane composition of claim 3 wherein the active hydrogen-bearing compound is bisphenol A.

5. The organosilicon/oxirane composition of claim 1 wherein the organosilicon is an acylamino silane.

6. The organosilicon/oxirane composition of claim 5 wherein the acylamino silane is gamma-ureidopropyltriethoxysilane.

7. The organosilicon/oxirane additive of claim 6 wherein the gamma-ureidopropyltriethoxysilane is employed in an alcoholic solution.

8. The organosilicon/oxirane composition of claim 5 wherein the acylaminosilane is

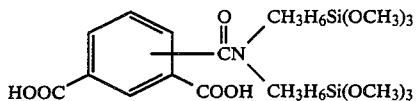

9. The organosilicon/oxirane composition of claim 1 wherein the organosilicon is a cyano silane.

10. The organosilicon/oxirane composition of claim 9 wherein the cyanosilane is cyanoethyltrimethoxysilane.

11. The organosilicon/oxirane composition of claim 9 wherein the cyanosilane is cyanoethyltriethoxysilane.

12. The organosilicon/oxirane composition of claim 1 wherein the oxirane compound is an epoxy resin and the organosilicon is an acylaminosilane.

13. The organosilicon/oxirane composition of claim 12 wherein the acylamino silane is gamma-ureidopropyltriethoxysilane.

14. A filler with an integrally blended additive wherein the additive is the organosilicon/oxirane composition of claim 1.

15. The filler of claim 14 wherein the filler is clay.

16. The filler of claim 14 wherein the filler is mica.

17. The filler of claim 14 wherein the filler is wollastonite.

18. The filler of claim 14 wherein the filler is chopped glass.

19. A filler with a pre-treated additive wherein the additive is the organosilicon/oxirane composition of claim 1.

20. The inorganic filler of claim 19 wherein the filler is clay.

21. The filler of claim 19 wherein the filler is mica.

22. The filler of claim 19 wherein the filler is wollastonite.

23. The filler of claim 19 wherein the filler is chopped glass.

24. A condensation polymer with an integrally blended additive wherein the additive is the organosilicon/oxirane composition of claim 1.

25. A filled condensation polymer composite comprising:
(a) from 5 to 85 weight percent of an organosilicon/oxirane composition filler mixture, based on the weight of the filled condensation polymer composite, said filler mixture containing from 80 to 99.98 weight percent of a filler based the weight of the filler mixture and from 0.02 to 20 weight percent of the organosilicon/oxirane composition of claim 1 based on the weight of the filler mixture; and
(b) from 15 to 95 weight percent of a condensation polymer based on the weight of the filled condensation polymer composite.

26. The filled condensation polymer composite of claim 25 wherein the condensation polymer is either a polyester or a polyamide or a blend thereof and/or with other polymers.

27. The filled condensation polymer composite of claim 25 wherein the condensation polymer is polybutylene terphthalate.

28. The filled condensation polymer composite of claim 25 wherein the condensation polymer is polyethylene terphthalate.

29. The filled condensation polymer composite of claim 25 wherein the condensation polymer is a polyamide nylon material.

30. The filled condensation polymer composite of claim 27 wherein the organosilicon/oxirane composition is an acylaminosilane/epoxy resin composition.

31. The filled condensation polymer composite of claim 28 wherein the organosilicon/oxirane composition is an acylaminosilane/epoxy resin composition.

32. The filled condensation polymer composite of claim 29 wherein the organosilicon/oxirane composition is an acylaminosilane/epoxy resin composition.

* * * * *